UNITED STATES PATENT OFFICE.

ROBERT G. HOWARD, OF NEWTON, MASSACHUSETTS.

CHANGEABLE EXHIBITOR.

No. 859,224.      Specification of Letters Patent.      Patented July 9, 1907.

Application filed November 11, 1905. Renewed December 21, 1906. Serial No. 348,873.

*To all whom it may concern:*

Be it known that I, ROBERT G. HOWARD, of Newton, county of Middlesex, State of Massachusetts, have invented an Improvement in Changeable Exhibitors, of which the following description, in connection with the accompanying drawings, is a specification, like characters on the drawings representing like parts.

This invention relates to changeable exhibitors, and has for its object to construct a changeable exhibitor adapted to be applied to a weighing machine, the operation of which is controlled by the movable platform of said machine to bring different exhibits or advertisements to view or to display a different exhibit or advertisement each time the platform is depressed.

My invention comprehends the employment of actuating means for the changeable exhibitor, the operation of which is controlled by the movable platform of the weighing machine, whereby whenever said platform is depressed by a weight upon it, as for instance, to operate the indicating device of the said machine, the exhibiting device will be operated, said actuating means being preferably elastically connected with the exhibiting device to obviate too suddenly operating it.

Figure 1:
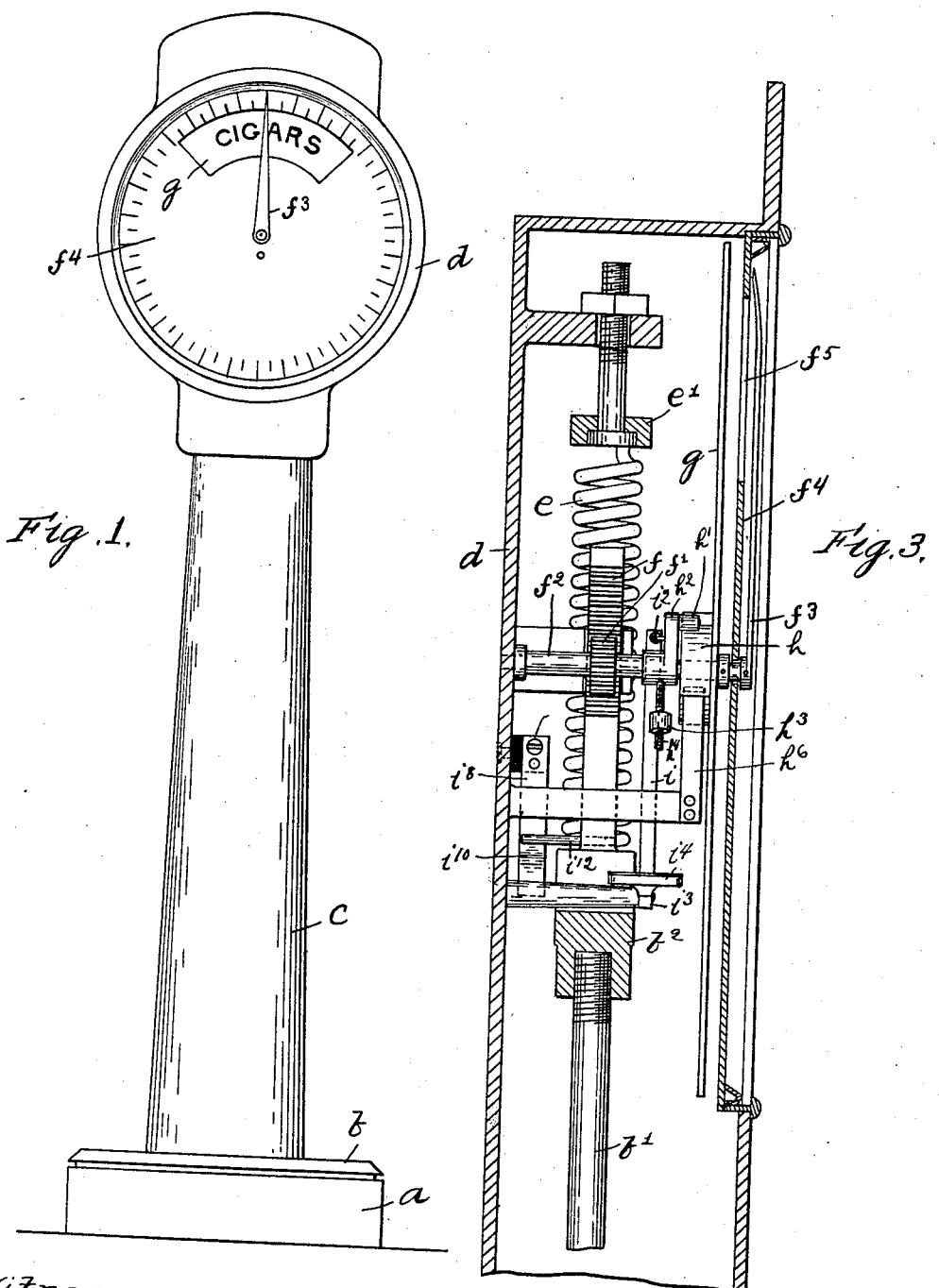
Figure 2:
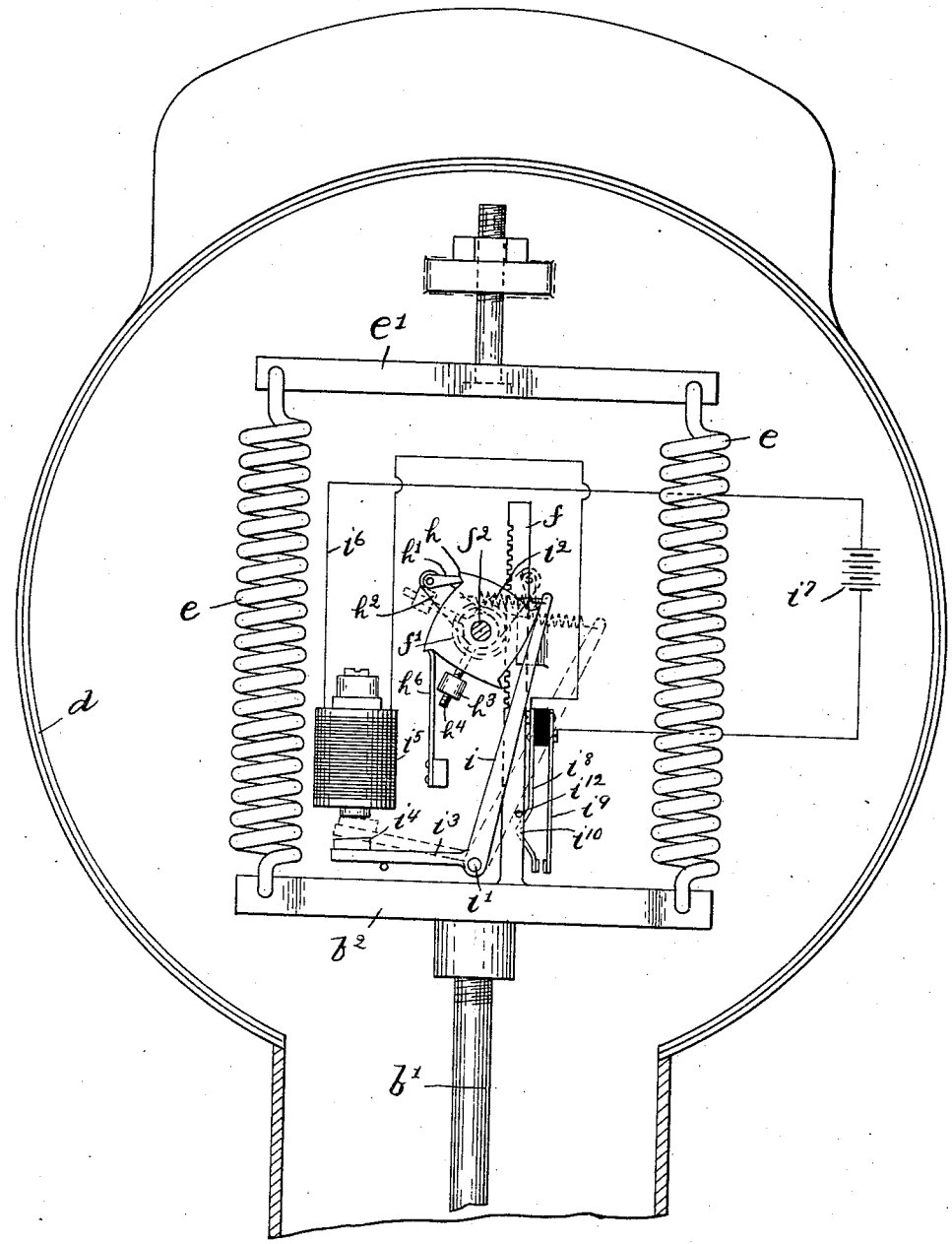

Figure 1 shows in front elevation a changeable exhibitor embodying this invention, applied to a weighing machine which is essentially of ordinary construction. Fig. 2 is an enlarged front elevation of the head of the machine, the dial plate and exhibiting disk being removed to expose the operating parts. Fig. 3 is a vertical section of the head of the machine taken on the dotted line 3—3, Fig. 2.

$a$ represents the base of the machine, $b$ the movable platform, $c$ a column rising from the base $a$ which contains the platform rod $b'$, and $d$ a circular or other shaped head which is mounted on the column $c$ and which contains the operating parts.

The platform rod $b'$ is connected at its upper end to a frame $b^2$ to which the lower ends of the weighing or other supporting springs $e$, $e$, are attached, and the upper ends of said springs are attached to a cross bar $e'$ which is adjustably supported at the top of the head $d$. A rack bar $f$ is formed upon or erected on the frame $b^2$, which extends upward and its teeth engage a pinion $f'$ secured to a shaft $f^2$, having its bearings centrally disposed in the head $d$. An indicator hand or pointer $f^3$ is secured to the shaft $f^2$ which moves over a dial plate $f^4$, set in the front of the head $d$.

The mechanism thus far described is common in weighing machines and is herein shown merely for the sake of illustrating my invention, and I desire it to be understood that my invention comprehends the employment of any other equivalent form of weighing mechanism by which the weight of the person standing on the movable platform may be indicated, or any other form of spring supported or spring balanced or movable platform which is adapted to be depressed by the weight of a person standing upon it.

The exhibiting device consists essentially of a disk $g$, mounted on the shaft $f^2$ back of the dial plate $f^4$; said disk having secured to or printed upon or otherwise provided thereon any number of exhibits or advertisements. The exhibits or advertisements are displayed through an opening $f^5$ in the dial plate $f^4$. A ratchet wheel $h$ is secured to or rigidly connected with said disk $g$, having any desired number of teeth, but preferably a number corresponding to the number of exhibits or advertisements on the disk, and said ratchet wheel is engaged by a pawl $h'$ pivoted to the extremity of an arm $h^2$, which is mounted to turn loosely on the shaft $f^2$. The pawl-carrying arm $h^2$ has a weight attached to it, which is herein shown as a block $h^3$, mounted on the screw threaded portion of an arm $h^4$, which is attached to the pawl-carrying arm $h^2$. $h^6$ represents a spring which engages the ratchet wheel and prevents backward rotation thereof. A lever $i$ is pivoted at $i'$ to the frame which extends upward and its upper end is connected by a spring $i^2$ to the pawl-carrying arm, and said lever has a short arm $i^3$ extended from it bearing the armature $i^4$ of an electro-magnet $i^5$ which is included in a circuit $i^6$ with a battery $i^7$. The said circuit contains a circuit operating device for closing it whereby the electro-magnet is energized and the actuating lever operated to move the pawl-carrying arm and turn the ratchet-wheel and disk connected thereto. The circuit operating device herein shown consists of a pair of contact pens $i^8$, $i^9$ normally disengaged from each other, one of said pens having a projection $i^{10}$ which is adapted to be engaged by a pin $i^{12}$ projecting from the rack bar or frame or other part of the weighing mechanism. Whenever the pin-bearing-member is moved downward the pin moves the contact pen $i^8$ into engagement with the contact pen $i^9$ and closes the circuit. The spring $i^2$ between the actuating lever and pawl-carrying arm provides an elastic connection so as to obviate too suddenly moving said arm. The pin $i^{12}$ normally occupies a position just above the projection $i^{10}$, so as to engage said projection and move the contact pen during the first part of its downward movement. As the pin continues its downward movement it passes by said projection and thereby permits the pens to separate. On the return movement of the pin the contact pens are again operated and the actuating lever again caused to turn the exhibiting device or disk.

The form of exhibiting device herein shown is simple and capable of displaying quite a number of exhibits or advertisements, but I desire it to be understood that my invention comprehends the employment of any other form of exhibiting device in lieu of the form herein shown, and furthermore my invention comprehends any other form of motor for operating the exhibiting device, the operation of which is adapted to be controlled by the movable platform in lieu of the motor or other means herein shown.

Having thus described my invention, what I claim as new and desire to secure by Letters Patent is:—

1. In a changeable exhibitor, the combination of a movable platform, an exhibiting device, a ratchet-wheel and pawl for operating it step by step, an arm bearing said pawl, a pivoted lever, an elastic connection connecting it with the pawl-carrying arm, and actuating means for said lever, the operation of which is controlled by said platform, substantially as described.

2. In a changeable exhibitor, the combination of a movable platform, an exhibiting device, a ratchet-wheel and pawl for operating it step by step, an arm bearing said pawl a pivoted lever, an elastic connection connecting it with the pawl-carrying arm, an electro-magnet for operating said lever, and means for operating the circuit of said electro-magnet, the operation of which is controlled by said platform, substantially as described.

3. In a changeable exhibitor, the combination of an indicating device comprising a dial and an indicating hand, a platform, weighing springs, means connecting said weighing springs and said indicating hand with said platform, an exhibiting device having a plurality of exhibits, and means for operating said device on both the descent and ascent of said platform to successively display the exhibits, substantially as described.

4. In a changeable exhibitor, the combination of an indicating device comprising a dial and an indicating hand, a platform, weighing springs, means connecting said weighing springs and said indicating hand with said platform, an exhibiting device having a plurality of exhibits, an electro-magnet for operating it to successively display the exhibits, a circuit for said electro-magnet, a circuit operating device for said circuit and means for operating said circuit operating device upon the descent and again upon the ascent of said platform, substantially as described.

5. In a changeable exhibitor, the combination of an indicating device comprising a dial having a display opening and an indicating hand, a platform, weighing springs, means connecting said platform with said weighing springs, and also with said indicating hand, an exhibiting disk back of said dial and actuating means for said disk, the operation of which is controlled by said platform, substantially as described.

6. In a changeable exhibitor, the combination of an indicating device comprising a dial and an indicating hand, a platform, weighing springs, means connecting said platform with said weighing springs, and also with said indicating hand, an exhibiting disk, means for moving it step by step, and an actuating device for said means, the operation of which is controlled by said platform, substantially as described.

7. In a changeable exhibitor, the combination of an indicating device comprising a dial and an indicating hand, a platform, weighing springs, means connecting said platform with said weighing springs, and also with said indicating hand, an exhibiting disk and ratchet-wheel thereon, a pawl engaging said ratchet-wheel, and an actuating device for said pawl, the operation of which is controlled by said platform, substantially as described.

8. In a changeable exhibitor, the combination of an indicating device comprising a dial and an indicating hand, a platform, weighing springs, means connecting said platform with said weighing springs, and also with said indicating hand, a changeable exhibiting device, and a motor for operating said exhibiting device, the operation of which is controlled by said platform, substantially as described.

9. In a changeable exhibitor, the combination of an indicating device, a platform, weighing springs, means connecting said platform with said weighing springs and also with said indicating device, an exhibiting device having a plurality of exhibits, an electro-magnet for operating it to successively display the exhibits and means for operating the circuit of said electro-magnet controlled by said platform, substantially as described.

10. In a changeable exhibitor, the combination of an indicating device, a platform, weighing springs, means connecting said platform with said weighing springs and also with said indicating device, an exhibiting disk having thereon a plurality of exhibits, a step-by-step device for operating said disk to successively display the exhibits, an electro-magnet for operating said step-by-step device, and means for operating the circuit of said electro-magnet, controlled by said platform, substantially as described.

11. In a changeable exhibitor, the combination of a dial having a display opening and an indicating hand, a platform, weighing springs, means connecting said platform with said weighing springs and also with said indicating hand, an exhibiting disk back of said dial and a motor for moving said disk step by step the operation of which is controlled by said platform, substantially as described.

12. In a changeable exhibitor, the combination of a dial having a display opening and an indicating hand, a platform, weighing springs, means connecting said platform with said weighing springs and also with said indicating hand, an exhibiting disk back of said dial and a motor for operating said disk step by step, the operation of which is controlled by said platform upon its descent and again upon its ascent; substantially as described.

13. In a changeable exhibitor, the combination of an indicating device, a platform, weighing springs, means connecting said platform with said weighing springs and also with said indicating device, an exhibiting device, a ratchet-wheel and pawl for operating it step by step, a pivoted lever elastically connected with the pawl-carrying arm and actuating means for said lever, the operation of which is controlled by said platform, substantially as described.

14. In a changeable exhibitor, the combination of an indicating device, a platform, weighing springs, means connecting said platform with said weighing springs and also with said indicating device, an exhibiting device, a ratchet-wheel and pawl for operating it step by step, a pivoted lever elastically connected with the pawl-carrying arm, an electro-magnet for operating said lever, and means for operating the circuit of said electro-magnet, the operation of which is controlled by said platform, substantially as described.

15. In a changeable exhibitor, the combination of an indicating device, a platform, weighing springs, means connecting said platform with said weighing springs and also with said indicating device, an exhibiting device, and actuating means for said device adapted to be operated by the descent and also by the ascent of said platform, substantially as described.

16. In a changeable exhibitor, the combination of an indicating device, a platform, weighing springs, means connecting said platform with said weighing springs and also with said indicating device, an exhibiting device, an electro-magnet for operating it, a circuit for said electro-magnet, a circuit operating device for said circuit and means for operating said circuit operating device upon the descent and again upon the ascent of said platform, substantially as described.

17. In a changeable exhibitor, the combination with weighing-mechanism and a movable platform to which it is connected, of an exhibiting device having a plurality of exhibits, and means for operating said device on both the descent and ascent of said platform to successively display the exhibits, substantially as described.

18. In a changeable exhibitor, the combination with weighing-mechanism and a movable platform to which it is connected, of an exhibiting device, and means for operating it at the end of the upward movement of the platform, substantially as described.

In testimony whereof, I have signed my name to this specification, in the presence of two subscribing witnesses.

ROBERT G. HOWARD.

Witnesses:
B. J. NOYES,
H. B. DAVIS.